No. 726,991. PATENTED MAY 5, 1903.
M. A. ROLLMAN.
FOOD CHOPPER.
APPLICATION FILED MAY 15, 1902.
NO MODEL. 2 SHEETS—SHEET 1.
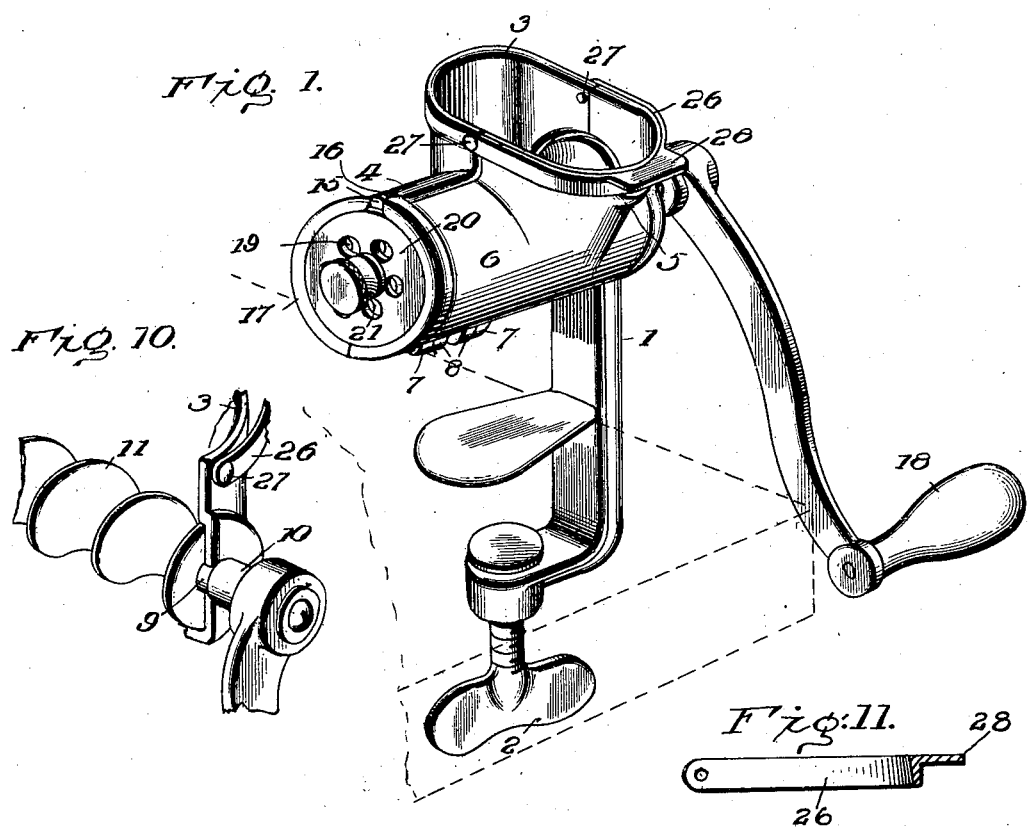
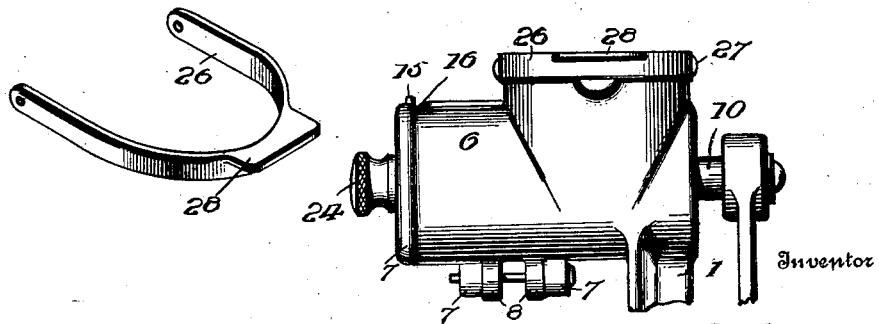
Witnesses
Wm. J. Jacob
A. G. Miller
Inventor
Michael A. Rollman.
By C. T. Fitzgerald
Attorneys No. 726,991. PATENTED MAY 5, 1903.
M. A. ROLLMAN.
FOOD CHOPPER.
APPLICATION FILED MAY 15, 1902.
NO MODEL. 2 SHEETS—SHEET 2.
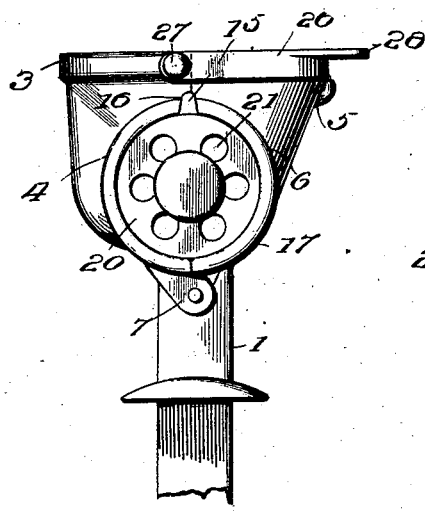
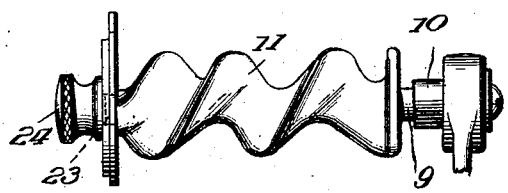
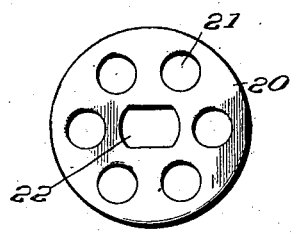
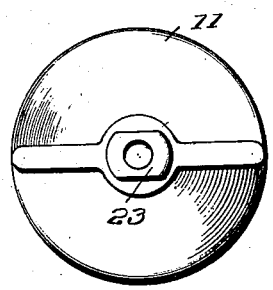
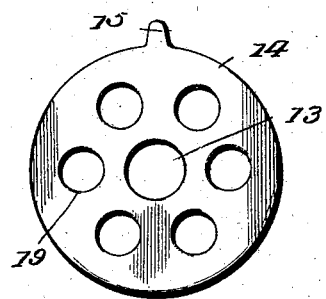
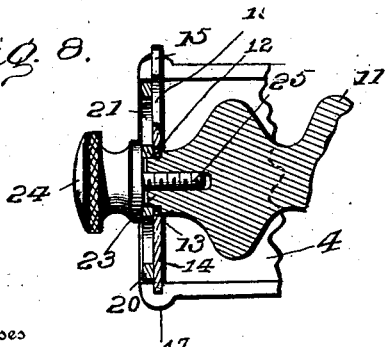
Inventor
Michael A. Rollman.
Witnesses No. 726,991. Patented May 5, 1903.

UNITED STATES PATENT OFFICE.

MICHAEL A. ROLLMAN, OF MOUNT JOY, PENNSYLVANIA.

FOOD-CHOPPER.

SPECIFICATION forming part of Letters Patent No. 726,991, dated May 5, 1903.

Application filed May 15, 1902. Serial No. 107,489. (No model.)

*To all whom it may concern:*

Be it known that I, MICHAEL A. ROLLMAN, a citizen of the United States, residing at Mount Joy, in the county of Lancaster and State of Pennsylvania, have invented certain new and useful Improvements in Food-Choppers; and I do hereby declare the following to be a full, clear, and exact description of the invention, such as will enable others skilled in the art to which it appertains to make and use the same.

My invention has relation to food-choppers, and more particularly to certain novel features of combination and construction of parts, the preferred form whereof will be hereinafter fully set forth, and pointed out in the claims, reference being had to the accompanying drawings, which are a part of this application.

The prime object of my invention is to provide a food-chopper which shall be composed of a few simple coöperating elements which when assembled in their respective operative positions shall prove thoroughly reliable and efficient in the discharge of their office of finely dividing or cutting the particles of meat or other variety of food to the desired extent or degree of fineness, the efficiency of the machine being as complete and reliable as any of the machines now on the market and employed for this purpose, though possessing a much greater variety of detail of construction and combination of elements.

A further object, among others, is to attain the greatest possible simplicity of construction without in any wise impairing the efficiency of the few coöperating parts.

A further object of my invention is to so combine the several parts that the actual wear or cutting strain shall be placed upon hardened-steel devices, thereby making it possible to utilize a lower and cheaper grade of metal in forming the other parts.

Other objects and advantages will be hereinafter more clearly set forth in the following specification, which shall be considered in connection with the accompanying drawings, in which—

Figure 1 is a perspective view of my invention complete ready for use. Fig. 2 is a side elevation of my invention as shown in Fig. 1 with the handle and supporting-standard broken away. Fig. 3 is a perspective detail view of the locking-bail employed to hold the separable halves of the body when said parts are disposed in a locked position. Fig. 4 is an end elevation of my invention shown in Fig. 1. Fig. 5 is a side elevation of the worm or screw and parts connected therewith removed from the body portion or housing. Fig. 6 is an end elevation of the worm or screw illustrated in Fig. 5 with the cutting-disk and regulating-screw removed. Fig. 7 is a detail view in elevation, showing the outer cutting-disk or knife. Fig. 9 is a similar view of the inner cutting-disk. Fig. 8 shows a longitudinal central section of the outer end of the worm, showing the two coöperating cutting-disks partly broken away and the relative position of said parts and the clamping or regulating screw threaded into the end of said worm-shaft. Fig. 10 is a detail of outer end of worm. Fig. 11 is a sectional detail through the bail.

The details of my invention will be designated by numerals, while the coöperating elements or accessories will also be similarly referred to, the same numeral applying to a corresponding part throughout the several views.

In common with all machines in this art I provide a suitable supporting-standard 1, having any preferred form of clamping-screw 2, by which said standard may be secured upon a shelf, table, or other convenient support, while preferably integrally formed with the upper portion of said standard is the semihopper-section 3, provided, as is usual, upon one side with the extension 4, said parts being designed as complementary respectively to the hopper-section 5 and the integral extension thereof 6, said parts 5 and 6 being provided with suitable ears 7, preferably upon their under side, adapted to coöperate with the ears 8, formed upon the sections 3 and 4. The semihopper-sections 3 and 5 are provided upon that side contiguous to the handle with an inwardly-directed lip or flange designed to be received by and fit snugly within the groove 9, formed upon a contiguous part of the journal 10, which latter may be readily formed, as by casting, as an integral part of the thrusting screw or worm 11, which, as is common with this class of machines, is designed to fit within the housing formed by the members 4 and 6, the outer end of said worm or screw being properly reduced or shaped to provide the journal 12, designed to receive and rotate within the aperture 13, disposed centrally in the thin cutting-disk 14, the said disk being held against rotation by the peripheral lug or ear 15, adapted to fit a suitable recess 16, formed by cutting away a portion of the meeting edges of the outer ends of the members 4 and 6, it being understood that said members are provided upon their extreme outer ends with a suitable groove which may be readily formed by providing the slight enlargement or rib 17 on the ends of said members. By this construction and disposition of parts it will be observed that the journal 12 thus finds a bearing or support in the aperture 13, in which it may be freely rotated by turning the handle 18, and in order that the food material which is thus being forced outward by the screw 11, through the plurality of apertures 19 in the stationary disk 14, may be properly acted upon and severed into minute particles I provide the coöperating cutting-disk 20, also having a plurality of apertures 21, adapted to coöperate with the apertures 19, said outer disk 20 being also provided with the centrally-disposed aperture 22, which should be oblong or angular in form and adapted to fit a correspondingly-shaped extension 23, formed upon the extreme outer end of the journal 12. By this construction and disposition of parts it will be clear that the outer cutting-disk 20 must necessarily move or rotate with the worm 11, and as said cutting-disks thus possess a relative movement any desired degree of close proximity of the cutting-disks may be effected by means of the thumb-screw 24, having its threaded shaft 25 diametrically seated in a threaded aperture provided in the end of the worm 11. Since, therefore, the inner disk is held stationary while the outer disk rotates with the worm, the coöperating apertures 19 and 21 will produce a shear-like cutting action upon the material forced therethrough by the actuating screw or worm 11. By thus making it possible to adjust the relationship of contact of the cutting-disks by means of said set-screw a full compensation for any wear upon the edges of the apertures thereof is attained, inasmuch as the cutting-faces of said disks are securely held in contact with each other and any wear of said parts only tends to more perfectly sharpen the extreme cutting parts thereof.

By reference to Fig. 1 and other views it will be observed that I have provided a very simple locking device, whereby the two members of the split hopper are very securely locked in their operative relationship by means of the pivoted bail-like latch 26, said latch being so pivoted to one of the members, as by the rivets 27, that it will receive and fit snugly down upon the upper edge of the other complementing member, a suitable handle 28 being provided to facilitate this adjustment of the bail or latch. If desired, the lower edge of said bail may be slightly flared, as seen in Fig. 11, thus enabling it to present a wedge-like action upon the edge of the hopper, and thereby draw the two hopper-sections very tightly and securely into a locked position and also permitting said parts to be as quickly and easily unlocked when it may be desirable to remove the worm and other coöperating parts, it being understood that the complementing-section 4 may be freely swung downward upon its hinges when said bail or latch has been elevated.

I desire to call particular attention to the fact that the combination and construction of parts above described makes it possible to employ extremely thin material in the manufacture of the inner disk 14, thus reducing the friction incident to the passage of the material through the apertures practically to the point of wholly eliminating such friction, it only being necessary to provide a thickness for the said inner disk as will be sufficient to sustain the end thrust of the material directed against it by the worm, and in this particular connection I wish to call attention to the fact that the annular groove 9, formed upon the handle end of the worm shaft or journal, is designed to hold the worm and the casing against relative movement, and since the peripheral edge of the inner disk is engaged and reinforced by resting in the grooves provided in a contiguous part of the casing it follows that said inner disk may be made of extremely thin material. In other words, since the worm or screw is held against longitudinal movement by a contiguous portion of part of the casing fitting in the groove 9, it will be obvious that the central portion of the inner disk is securely held by reason of its connection with the worm against buckling or outward movement, and it follows, therefore, that the only part of said disk which receives and sustains the pressure of the material will be the annular portion thereof between the peripheral edge which is engaged by the casing and the central portion which is engaged by the worm, thus making it clearly apparent that said inner disk may be made extremely thin and that it will consequently possess a knife-like cutting capacity. Since, therefore, the worm has no end thrust against the inner disk and the groove 17 is intended simply to keep the inner disk approximately in place for the performance of its office and also to provide a bearing for the end of the worm, it is desirable to provide means to prevent the central part of said disk from moving outward, and this is accomplished by means of the outer disk and the screw 24.

stIt will be understood that for cheap conruction no great accuracy is necessary in providing the groove 17 to receive the peripheral edge of the disk 14, thus admitting the castings comprising the casings to be cheaply and expeditiously manufactured. It is further obvious that the groove 17 also prevents the material being forced out around the edge of the disk 14 and that all of the outer thrust of the material on the inner disk is supported by the outer disk, which outer disk, it will be understood, should be made of sufficiently-heavy material to withstand all undue pressure which may possibly be brought against it.

As will be clearly apparent by reference to the drawings, this outer and heavier disk is firmly attached to the worm and the worm is securely held in place by the groove 9, as hereinbefore stated. I therefore desire to accentuate the statement that said inner disk 14 can be made of extremely thin material or just heavy enough to prevent any part of it which registers with or comes over the holes 21 in the outer disk from buckling or moving outward. Conversely, it follows that if there should be any back thrust of the worm upon the groove the part of the casing fitting said groove will minimize the thrust in such direction, while no possible damage could be done to the inner disk 14 by reason of the fact that the outer disk 14 will fully reinforce said inner disk, inasmuch as said outer disk may be made to cover the entire outer side of the inner disk except the extreme outer edges thereof engaged by the groove 17.

Should the inner disk be reduced to such degree of thinness that there will be any tendency to buckle or bend outward against the strain of the material, such outward bend would actually prove desirable and beneficial, inasmuch as the cutting part of said inner disk will thereby be forced all the more tightly against the contiguous face of the outer disk, thus insuring that the cutting process will be absolutely perfect.

Since the office of the outer disk is to sever the particles of food protruding through the apertures 19 no resistance is offered by said disk to the outward movement of the material. It is now common to employ an inner cutting-disk of sufficient thickness to sustain the entire end thrust of the material, and consequently the friction of forcing the material through the cutting-apertures is very considerable.

It will be seen from a consideration of the foregoing description that the adjusting of the thrusting-worm and the exterior casing so that there will be no relative longitudinal movement of said parts is a very valuable and important desideratum, and this result in the present instance I have accomplished by means of the simple groove 9, adapted to coöperate with a contiguous part of the casing, thereby entirely relieving the inner cutting-disk of the forward thrust of the worm, which would otherwise be directed against the central portion of said disk. By thus relieving the disk of the end thrust or force of the worm by the simple device above described or the equivalent thereof I am actually enabled to reinforce the central portion of the disk against outward movement by means of its connection with said worm, and thereby limit the strain upon the disk to that directed against it by the material driven by the worm, thus, as is obvious, making it possible to employ extremely thin stock in the formation of the inner cutting-disk, enabling such disk to be easily, cheaply, and expeditiously stamped out of sheet-steel.

It will of course be understood that an equivalent device or substitute for the groove 9 may be employed, my idea and invention being to place the strain of the end thrust of the worm in either direction upon the housing itself, thus leaving the outer disk on the end of the worm to be utilized as a reinforcement for the thin cutting-disk. The inner faces of the housing coöperating with the worm may be properly roughened or spirally corrugated, as is common, to facilitate the proper movement of the material toward the cutting-disk.

Various modifications or changes, it is obvious, may be made without departing from the spirit of my invention.

What I claim as new, and desire to secure by Letters Patent, is—

1. A combined casing and hopper formed in two parts hinged together, and a bail pivoted to one hopper-section and embracing the other to lock the sections together, the bail and one section being formed to seat the bail substantially as and for the purpose set forth.

2. A combined casing and hopper formed in two parts hinged together and a bail pivoted to one hopper-section and embracing the other to lock the sections together, one of said sections being formed with a lug or stop for the bail, substantially as and for the purpose set forth.

3. In a machine of the character described, the combination with a suitable casing, of a feeding-screw mounted in said casing, a stationary inner disk having its edge seated in a groove in the casing and of such flexibility as to be flexed by the thrust of the material being cut, and a reinforcing coöperating outer disk carried by and rotatable with said feeding-screw, substantially as described.

4. In a machine of the character described, the combination with a suitable casing having a circumferential groove at its outer end, of a feeding-screw mounted in said casing; a stationary inner disk having its edge seated in said circumferential groove and of such flexibility as to be flexed by the thrust of the material being cut, and reinforcing coöperating outer disk rotatable with said feeding-screw, said disks being provided with coöperating apertures constructed to produce a shear-like cutting action upon the material.

5. In a machine of the character described, the combination with a suitable casing formed in two parts and hinged together, of a feeding-screw mounted in said casing; a stationary inner disk of thin material of such flexibility as to be flexed by the thrust of the material being cut, a reinforcing coöperating outer disk rotatable with said feeding-screw and a thumb-screw having its threaded shaft diametrically seated in a threaded aperture in the end of said feeding-screw and bearing against the outer disk, adapted to adjust the relationship of said disks as and for the purpose set forth.

6. In a food-chopper, the combination with the feeding-screw, the journal of which is provided with a circumferential groove, of a two-part hopper, each half being provided upon one end with an inwardly-directed lip designed to be received by and fit snugly within said groove, said disk being of such flexibility as to be flexed by the thrust of the material being cut, said hopper-sections each being provided with an extension having on the inner side of its outer end a groove 17, a stationary disk seated in said groove and of such flexibility as to be flexed by the thrust of the material being cut, a reinforcing-disk attached to and movable with the feeding-screw and disposed in close contact with said stationary disk, to resist the thrust of the material being cut, and means for clamping the reinforcing-disk to the screw and for regulating the relationship of contact of the disks, to vary the cut, as and for the purpose set forth.

7. In a food-chopper, the casing formed in two complementary sections pivotally secured together, and a bail pivotally mounted at its ends to one of said sections and having its lower edge flared to give it a wedge action and adapted to embrace and to fit over the outer edge of the other section as and for the purpose set forth.

8. In a food-chopper, the casing formed in two complementary sections pivotally secured together, and a bail pivotally mounted at its ends to the end of one of said sections and having its lower edge flared to give it a wedge action and adapted to embrace and to fit over the outer edge of the other section and provided at its outer end with a projecting flange forming a handle, said sections having coincident recesses and a disk having a lug adapted to fit said recess and be held thereby against rotation, a feeding-screw having a bearing for its outer end in said stationary disk and a reinforcing-disk for said stationary disk mounted on and adapted to move with said screw, and a thumb-nut bearing against the reinforcing-disk and adjustable in the feed-screw, all substantially as shown and described.

9. In a food-chopper, a suitable exterior casing formed of two complementing pivotally-connected sections, each having a semi-hopper-section and a lateral extension which when placed together will form a housing, said housing having a lip; a feeding-screw rotatably mounted in said housing, the end of the shaft of said screw having a circumferential groove adapted to receive a corresponding lip of said housing whereby the longitudinal thrust imparted to said screw by the contents of the casing will be checked, all substantially as specified and for the purpose set forth.

10. The combination with a suitable casing formed in two parts and hinged together, each of said parts having upon one end coincident vertically-disposed grooves and upon the other inwardly-directed lips, of a feeding-screw mounted in said casing and having upon one end a circumferential groove adapted to receive said lips and upon the other end a cutting-disk having a central aperture loosely receiving the end of said screw and adapted to have its peripheral edge seated in said grooves, said disk being of such flexibility as to be flexed by the thrust of the material being cut unless supported exteriorly, and a reinforcing cutting-disk fixedly secured to the feeding-screw upon the outer side of said fixed disk to enable said flexible disk to resist the thrust of the material being cut, and a set-screw carried by the end of the feeding-screw and adapted to bear against the outer disk whereby the latter will rotate with the screw and may be brought to bear tightly or loosely against the inner cutting-disk, all substantially as specified and for the purpose set forth.

In testimony whereof I affix my signature in presence of two witnesses.

MICHAEL A. ROLLMAN.

Witnesses:
HENRY M. STAUFFER,
CORA LEIB.